US011388077B2

(12) United States Patent
Shah

(10) Patent No.: US 11,388,077 B2
(45) Date of Patent: Jul. 12, 2022

(54) COMPUTER-EXECUTABLE AND TRACEABLE METRIC QUEUES SYSTEM

(71) Applicant: Netspective Communications LLC, Silver Spring, MD (US)

(72) Inventor: Shahid N. Shah, Silver Spring, MD (US)

(73) Assignee: Netspective Communications LLC, Silver Spring, MD (US)

( * ) Notice: Subject to any disclaimer, the term of this patent is extended or adjusted under 35 U.S.C. 154(b) by 75 days.

(21) Appl. No.: 16/669,496

(22) Filed: Oct. 30, 2019

(65) Prior Publication Data

US 2020/0067811 A1    Feb. 27, 2020

(51) Int. Cl.
| | |
|---|---|
| *H04L 43/106* | (2022.01) |
| *G06F 16/21* | (2019.01) |
| *G06F 16/2458* | (2019.01) |
| *G06F 16/23* | (2019.01) |
| *G06F 16/248* | (2019.01) |
| *H04L 47/70* | (2022.01) |
| *G06F 16/28* | (2019.01) |
| *G01S 19/13* | (2010.01) |

(52) U.S. Cl.
CPC .......... *H04L 43/106* (2013.01); *G06F 16/212* (2019.01); *G06F 16/2365* (2019.01); *G06F 16/248* (2019.01); *G06F 16/2474* (2019.01); *G06F 16/285* (2019.01); *H04L 47/82* (2013.01); *G01S 19/13* (2013.01)

(58) Field of Classification Search
None
See application file for complete search history.

(56) References Cited

U.S. PATENT DOCUMENTS

| | | | |
|---|---|---|---|
| 8,712,370 B2 | 4/2014 | Ryan | |
| 10,169,731 B2 | 1/2019 | Brew et al. | |
| 10,270,854 B2 * | 4/2019 | Taylor | H04L 67/1004 |
| 10,333,799 B2 | 6/2019 | Bingham et al. | |
| 10,380,189 B2 | 8/2019 | Boe et al. | |

(Continued)

FOREIGN PATENT DOCUMENTS

WO    2019099065 A1    5/2019

*Primary Examiner* — Kevin T Bates
*Assistant Examiner* — Dae Kim
(74) *Attorney, Agent, or Firm* — Rahman LLC

(57) ABSTRACT

A computer-controlled system for digitally evaluating one or more computer-executable and traceable metrics associated with a machine at a node. The system includes a computerized data collection wireless device for collecting digital data stored in the form of a plurality of computer-executable files from the machine. The computerized data collection wireless device includes a metric logistics device that generates a metric queue containing a plurality of computer-executable metric components storing information indicative of at least one of a date, time, geo-coordinates, machine identification details, and computer readable and executable performance data associated with the machine. The system includes a data aggregator and a computer-controlled metric appliance communicatively coupled to the data aggregator and receives the metric queue from the data aggregator. The computer-controlled metric appliance analyzes and processes the metric queue to generate an output that is indicative of whether the metric is achieved or not by the machine.

15 Claims, 6 Drawing Sheets

(56) References Cited

U.S. PATENT DOCUMENTS

| | | | |
|---|---|---|---|
| 10,671,443 B1* | 6/2020 | Ramachandran | G06F 16/903 |
| 10,936,585 B1* | 3/2021 | Echeverria | G05B 13/00 |
| 11,062,042 B1* | 7/2021 | McKervey | G06F 16/245 |
| 2006/0245369 A1* | 11/2006 | Schimmelpfeng | H04L 43/08 370/252 |
| 2009/0157569 A1 | 6/2009 | Henby et al. | |
| 2017/0220610 A1 | 8/2017 | Laethem | |
| 2017/0286499 A1* | 10/2017 | Bingham | G06F 11/323 |
| 2018/0246942 A1 | 8/2018 | Chen et al. | |
| 2018/0255122 A1 | 9/2018 | Hu et al. | |
| 2019/0081720 A1* | 3/2019 | Barry | H04J 3/06 |
| 2019/0138542 A1* | 5/2019 | Van Beest | G06F 21/552 |
| 2019/0253434 A1* | 8/2019 | Biyani | H04L 63/065 |
| 2020/0036533 A1* | 1/2020 | Soundararajan | H04W 12/61 |
| 2020/0065303 A1* | 2/2020 | Bhattacharjee | G06F 16/278 |
| 2020/0341956 A1* | 10/2020 | Bayer | G06F 16/219 |

\* cited by examiner

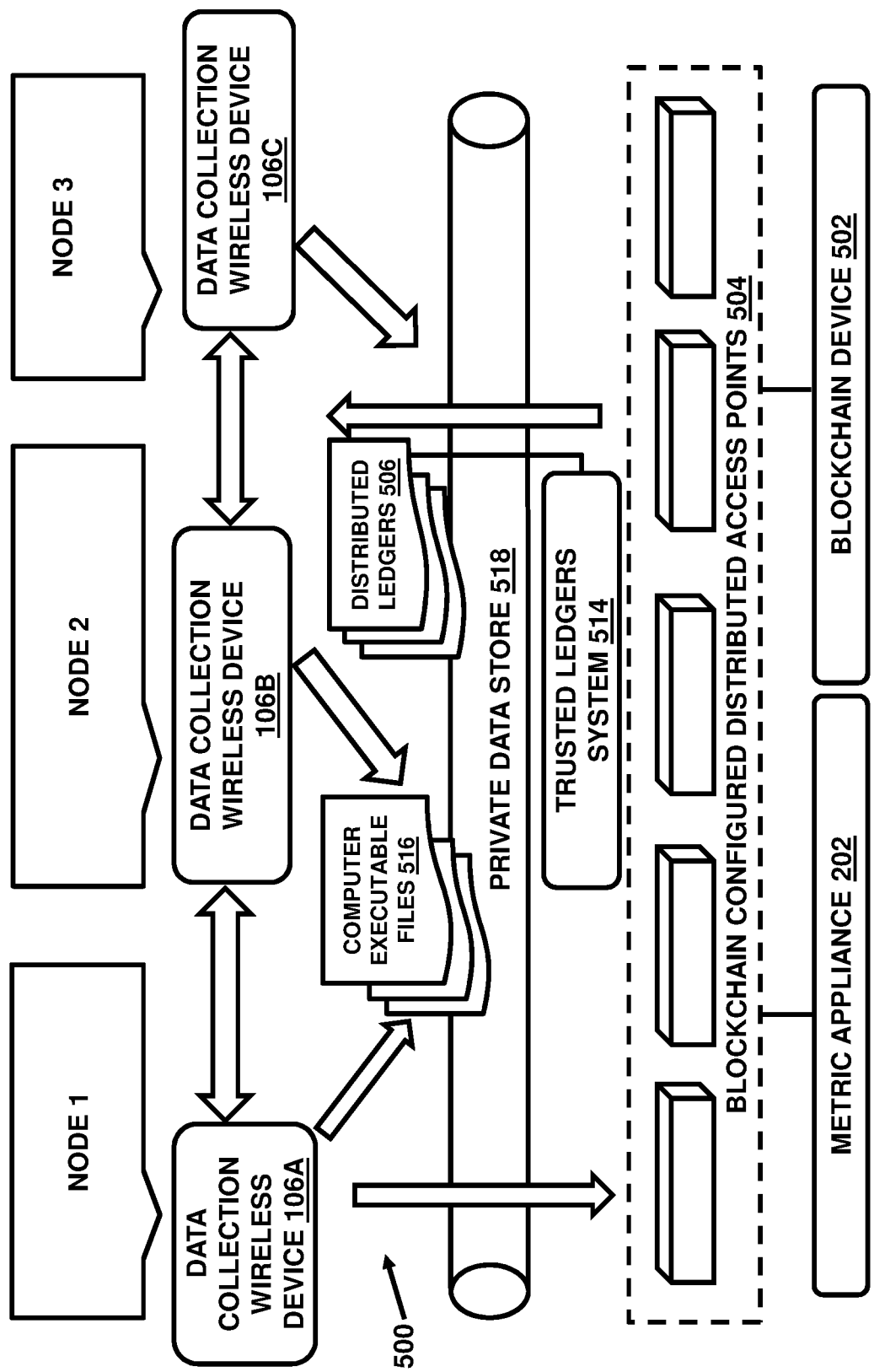

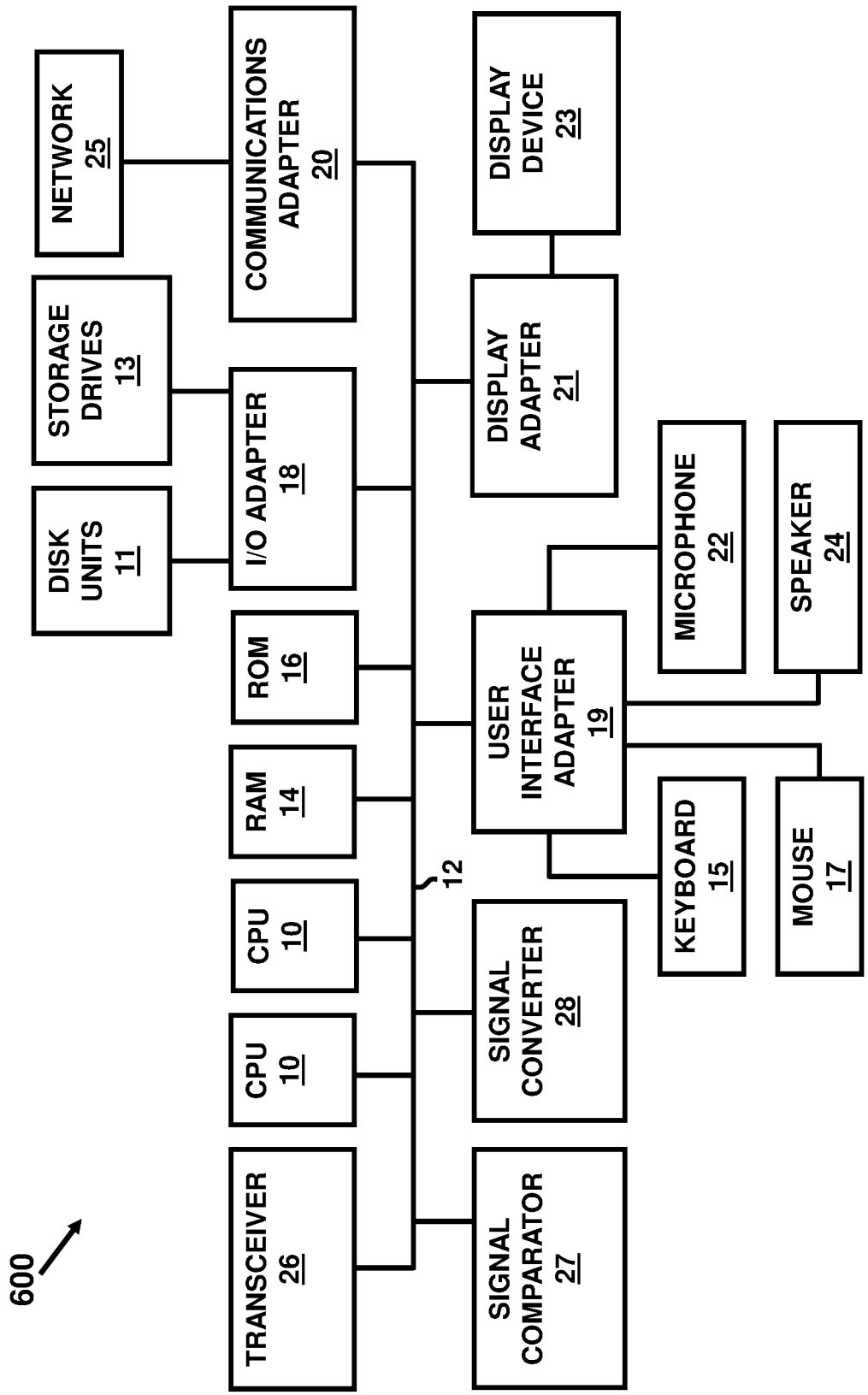

COMPUTER-EXECUTABLE AND TRACEABLE METRIC QUEUES SYSTEM

BACKGROUND

Technical Field

The embodiments herein generally relate to computer-controlled systems, and more particularly to a computer-controlled workflow system for monitoring digitally generated tasks measurements over a network.

Description of the Related Art

There are a lot of tasks that are supposed to be performed at particular times or over a particular period of time at a particular location. These tasks require various kinds of equipment, devices, systems etc. for execution. Successful execution of these tasks is necessary for achieving certain metrics defined for their performance. Today, in order to determine quality measures or metrics for these tasks, people try to determine how well these tasks are performed by various devices or people manually. This usually results in building a quality measure that says if something is performed in a particular manner, it will create a particular type of quality index. All these measures today are typically manually collected and there is not a suitable way to ensure an error-free output because of human intervention. Therefore, in the light of the above, there is a need of a new intelligent system that may allow monitoring and evaluation of metrics in a network of nodes.

SUMMARY

An embodiment herein provides a computer-controlled system for digitally evaluating one or more computer-executable and traceable metrics associated with a machine at a node. The system includes a computerized data collection wireless device for collecting digital data stored in the form of a plurality of computer-executable files from the machine associated with the node in a physical setting. The node is communicatively connected with one or more other nodes such that the one or more other nodes and the node together form a computer network of nodes. The computerized data collection wireless device includes a metric logistics device configured to generate a metric queue containing a plurality of computer-executable metric components storing information indicative of at least one of a date, time, geo-coordinates, machine identification details, and computer readable and executable performance data associated with the machine. The system further includes a data aggregator configured to receive and store the metric queue from the node locally for a retention period. The system further includes a computer-controlled metric appliance communicatively coupled to the data aggregator and receiving the metric queue from the data aggregator, wherein the computer-controlled metric appliance includes a processing circuit that is configured to analyze and process the metric queue associated with the machine at the node to generate a computer readable and executable output that is indicative of whether the metric is achieved or not by the machine. The computer-controlled metric appliance includes a time series database built to handle the computer-executable metric queue and associated measurements that are time-stamped and location-stamped in the form of a plurality of computer-executable metric clusters of time-location series. The computer-controlled metric appliance further includes a blockchain device communicatively coupled with the time series database for providing blockchain capabilities to the computer-controlled metric appliance, wherein the blockchain device includes a distributed digital ledger system for storing trust notes and creating smart contracts associated with the metric queue.

The machine may be a first machine such that the first machine may be communicatively coupled to a second machine and a third machine, wherein each of the first machine, the second machine, and the third machine may be located physically at the node such that the node may be communicatively coupled to the other nodes in the network wirelessly.

The metric and the computer-executable task may be dependent on performance of the first machine and the second machine.

The metric and the computer-executable task may be dependent on performance of the first machine only.

The plurality of computer-executable metric components of the metric queue may include a first computer-executable metric component defined as a computer-executable file storing information indicative of time of execution of the computer-executable task performed by the machine at the node.

The plurality of computer-executable metric components of the metric queue may include a second computer-executable metric component defined as a computer-executable file storing information indicative of date of execution of the computer-executable task performed by the machine at the node.

The plurality of computer-executable metric components of the metric queue may include a third computer-executable metric component defined as a computer-executable file storing information indicative of geographical coordinates (GPS location) associated with the execution of the computer-executable task performed by the machine at the node.

The plurality of computer-executable metric components of the metric queue may include a fourth computer-executable metric component defined as a computer-executable file storing information indicative of digital identification details of the machine and an associated entity pertinent to the execution of the computer-executable task performed by the machine at the node.

The plurality of computer-executable metric components of the metric queue may include a fifth computer-executable metric component defined as a computer-executable file storing information indicative of the computer readable and executable performance data associated with the computer-executable task performed by the machine.

The system may further include a GPS device to collect location details by real-time tracking of the event occurrences or performance of the computer-executable tasks as executed by the machine at the node.

The time series database may include a memory for storing time-stamped or time series data digitally, such that the stored data may include measurements and event occurrences that may be tracked, monitored, down-sampled, and aggregated with time and maintained in the form of the metric queue.

The time series database may store a set of key figure values such that each key figure value may be indicative of a computer-executable task associated with the metric queue that may be organized and stored in the form of the configurable clusters based on an association of the key figure values and respective individual time periods in the time series associated with the computer-executable task.

The metric appliance may further include a metrics dashboard to display information pertinent to the metric queue in the form of user-friendly statistical patterns and graphical images on a display device.

The computerized data collection wireless device may further include a metric identifier device configured to define and provide a set of computer-executable identifiers for the one or more computer-executable and traceable metrics.

The set of computer-executable identifiers may be determined based on a plurality of inputs either provided manually through a computerized system or generated through an automated process based on data acquired from one or more information sources.

The blockchain device may be coupled to a private data store such that an entity accesses the time series database through the private data store.

An embodiment herein provides a computer-controlled system for digitally evaluating one or more computer-executable and traceable metrics associated with a machine at a node. The system includes a computerized data collection wireless device for collecting digital data stored in the form of a plurality of computer-executable files from the machine associated with the node in a physical setting. The node is communicatively connected with one or more other nodes such that the one or more other nodes and the node together form a computer network of nodes. The computerized data collection wireless device includes a metric logistics device configured to generate a metric queue containing a plurality of computer-executable metric components storing information indicative of at least one of a date, time, geo-coordinates, machine identification details, and computer readable and executable performance data associated with the machine. The system further includes a data aggregator configured to receive and store the metric queue from the node locally for a retention period. The system further includes a computer-controlled metric appliance communicatively coupled to the data aggregator and receiving the metric queue from the data aggregator, wherein the computer-controlled metric appliance includes a processing circuit that is configured to analyze and process the metric queue associated with the machine at the node to generate a computer readable and executable output that is indicative of whether the metric is achieved or not by the machine. The computer-controlled metric appliance includes a time series database built to handle the computer-executable metric queue and associated measurements that are time-stamped and location-stamped in the form of a plurality of computer-executable metric clusters of time-location series.

The plurality of computer-executable metric components of the metric queue may include a computer-executable metric component defined as a computer-executable file storing information indicative of time of execution of the computer-executable task performed by the machine at the node.

The plurality of computer-executable metric components of the metric queue may include a computer-executable metric component defined as a computer-executable file storing information indicative of geographical coordinates (GPS location) associated with the execution of the computer-executable task performed by the machine at the node.

The computerized data collection wireless device may further include a metric identifier device configured to define and provide a set of computer-executable identifiers for the one or more computer-executable and traceable metrics.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 illustrates a blockchain computer architecture of the system of FIG. 2 along with other systems in accordance with an embodiment herein; and FIG. 6 is a block diagram illustrating a computer system according to an embodiment herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
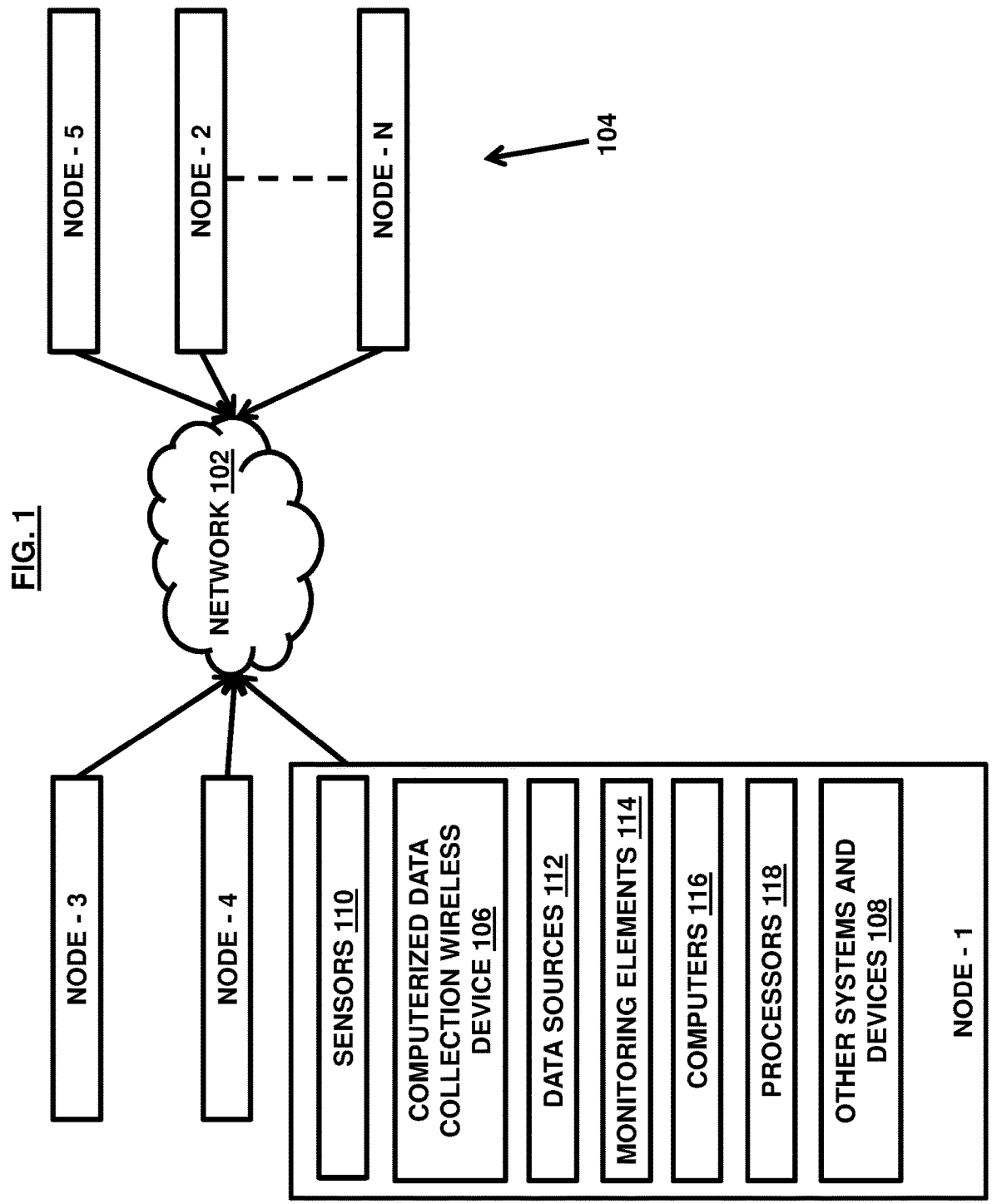
FIG. 1 illustrates an example of a computer environment or architecture in which various embodiments herein may operate.

FIG. 1 illustrates a network 102 of a plurality of nodes 104 interacting with one another. The nodes 104 may comprise node 1, node 2, node 3, node 4, node 5, node N, and many more nodes to show a few as examples merely for illustration herein. In embodiments, there could be thousands of nodes 104 associated with the network 102. Each node such as node 1 may comprise several components and devices as will be referred to and discussed in conjunction with subsequent figures.

Figure 2:
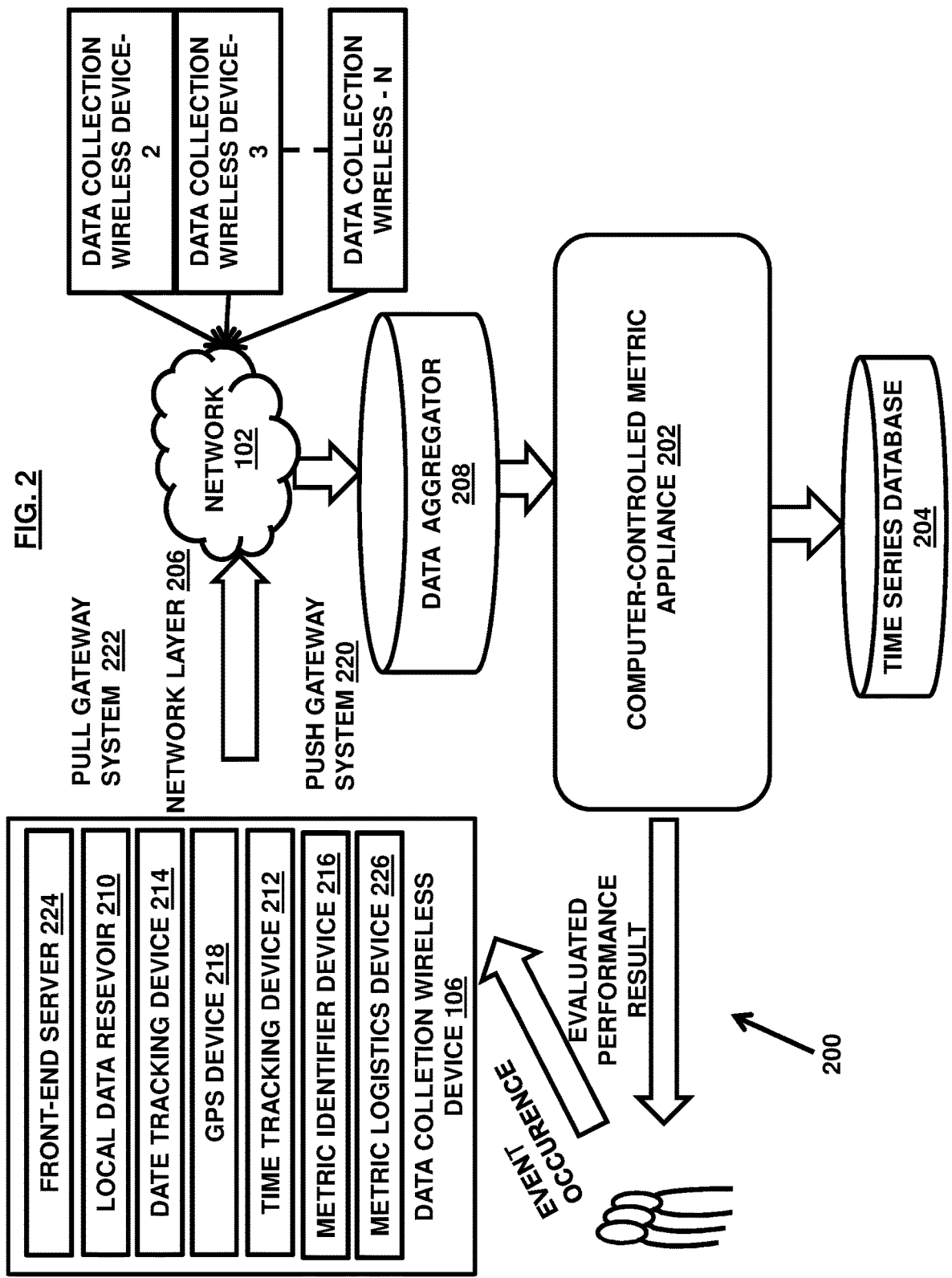
FIG. 2 illustrates a schematic diagram of a computer system for facilitating evaluation and digital management of one or more computer-executable and traceable metrics in accordance with an embodiment herein.

FIG. 2, with reference to FIG. 1, illustrates a system 200 for facilitating evaluation and digital management of one or more computer-executable and traceable metrics (hereafter referred to as computer-executable and traceable metrics) in a computer-governed ecosystem, wherein the computer-governed ecosystem may operate across a variety of scenarios and physical settings including but not limited to a health unit, a corporation, a manufacturing facility, etc. The system 200 may include a wireless computerized network which may be the network 102 of FIG. 1 of the plurality of peers or nodes 104 (the terms 'peer' and 'node' may be used interchangeably herein throughout the document without restricting the scope) and a computer-controlled metric appliance 202. The computer-controlled metric appliance 202 may further generate a time series database 204. The system 200 may further include a network layer 206 and a data aggregator 208 (also referred to as a central database without limitations). The network 102 may be a peer-to-peer network in embodiments.

A node or a peer such as the node 1 or other nodes shown in various figures herein may refer to technical capabilities-equipped systems or devices together associated with a physical setting and may comprise for example a computerized data collection wireless device 106, sensors 110, data sources 112, monitoring elements 114, computers 116, processors 118, and various other systems and devices 108, installed within the physical setting. In some embodiments, the node 1 may be associated with or may refer to the particular physical setting equipped with computer-enabled infrastructure for allowing a set of computer-controlled functions or tasks utilizing such as the data sources 112, sensors 110, monitoring elements 114, computers 116, and the processors 118 without limitations. The node 1 may be defined by specific geographical coordinates that may indicate its location with respect to other nodes such as node 2, node 3, etc. in the network 102. For example, in an embodiment, a hospital may refer to a physical setting and its interaction within the network 102 may be referred through the node 1 such that the computerized data collection wireless device 106 and the other devices and systems 108, sensors 110 etc. may be associated with the hospital or the node 1 in the network 102 to differentiate them from devices and data collection devices associated with other physical settings in the network 102 referred to as other nodes.

The computerized data collection wireless device 106 may be configured to perform certain data collection tasks within the network 102 digitally as will be described later in conjunction with various figures. Other components associated with the node 1 may also perform their specified tasks digitally. Similarly, there may be several other nodes in the network 102 that may be connected to the node 1 (hospital coordinates) over the network 102 which may contain various sub-components and systems configured to perform specific tasks as assigned to them in the network 102. The tasks (or computer-executable tasks) performed by the devices associated with the node 1 including the tasks performed by the computerized data collection wireless device 106 at node 1 remain uninfluenced from the computer-executable tasks assigned to the devices associated to the other nodes such as node 2 or node 3 etc. All the devices including the data collection wireless device 106 associated with the node 1, in some embodiments, may be assigned specific digital or computer-executable tasks to perform that may be independent of the tasks assigned to the other nodes in the peer network. In embodiments, each node 104 associated with a respective physical location may be allowed to interact with entities (such as associated persons), devices, systems, components, computers etc. that are established within the respective physical setting only. In the example mentioned herein, the computerized data collection wireless device 106 may be allowed to generate and/or collect data from the devices that operate within the physical setting or the hospital associated with it. Various other physical settings defined by specific geographical coordinates may be connected through the network 102. The network 102 may be a wireless or a physical network configured to operate as a peer network in some embodiments.

The data collection wireless device 106 in FIG. 2 may further include a local data reservoir 210, a time tracking device 212, a date tracking device 214, and a metric identifier device 216 such that data collection wireless device 106 may be configured to collect, store, and digitally manage data at the node 1 that is extracted or collected from the devices operating and performing the computer-executable tasks at the node 1. The time tracking device 212 may be a computerized digital clock which may track the time of any entry or exit of data related to one or more computer-executable tasks associated with one or more of the devices at the node 1 or event occurrences at the node 1. The time tracking device 212 may be used to calculate the time taken in a service delivery or task completion by tracking the starting and ending time of an event occurrence for example. The time tracking device 212 of the data collection wireless device 106 in the node 1 may help in the evaluation of time associated with a computer-executable task performed by a particular device in the node 1 such that any time-dependent computer-executable and traceable metric may be evaluated for its performance by comparing the time that is associated with the metric with the time that is actually spent in the occurrence of the event. For example, in a hospital setting, if a patient is to stay for three days in the hospital, the metric may be determined for its performance with respect to actual time stay of three days. The time tracking device 212 may be utilized to actually clock the time of the stay to compare it with its metric time which is three days.

The date tracking device 214 may be configured to execute a computerized software technique which may control and help in tracking the date associated with an event at the node 1 in the peer network 102. An output generated by the date tracking device 214 and the time tracking device 212 may be used to find if a metric is pending or if the metric is about to complete in future for example or if there is a progress in the performance for the metric with respect to the passage of time and if the progress is as expected or slowed etc. when read in conjunction with a performance output generated by the device at the node 1 in the form of a computer-executable file or component that is indicative of performance delivery by the device. For example, the date tracking device 214 may help in finding if an annual visit or some routine visit of a patient is pending or yet to occur by crawling through the data collected by the data collection wireless device 106 and processing the data to generate the output indicative of the metric performance with respect to time in association with the output generated by the time tracking device 212. The date tracking device 214 and the time tracking device 212 may help in monitoring time for event occurrences that have been completed or scheduled to happen in future and generate information about pending events associated with the node 1.

The Global Positioning Service (GPS) device 218 of the data collection wireless device 106 may help in real-time tracking of the event occurrences or performance of the computer-executable tasks as executed by the various devices and the sub-systems at node 1, by collecting their location details. Real-time tracking may offer different challenges in the tracking of the event occurrences or tasks depending on the complexity of the event occurrences when it is performed manually and takes time, resources and manpower. Location data may be collected in most cases by the GPS device 218 using for example a radio-navigation system; though in some other specific cases different location technologies can be used. For example, in an ambulance service of a hospital, the GPS device 218 may help in real-time tracking of a patient being transferred, journey reports, stop reports, alerts, and scheduled reports for future.

The metric identifier device 216 is configured to define and provide computer-executable identifiers for the computer-executable and traceable metrics that are relevant at the node 1 or its respective physical setting. For each specific node or a type of business the node may be associated with, different key performance indicators (KPIs) and respective computer-executable and traceable metrics may be required and defined accordingly. The identification of the metrics and definition of a computer-executable process for monitoring computerized performance of the various devices and systems operating within the node such as the node 1 toward these metrics may be a complex task that may be achieved with the use of the metric identifier device 216. The metric identifier device 216 defines the metrics associated with the node 1 based on certain inputs either provided manually through computerized systems or generated through automated processes based on data acquired from operation reports, business reports, and/or computer generated executable files containing digitally stored performance and operational data of the various devices and systems in the node including without limitations digital data identifying specifications of the devices. In embodiments, each computer-executable metric, hereafter interchangeably referred to as the metric for simplicity of the description, may relate to a specific business outcome with a performance measure identified in the form of computer-executable codes or programs that are traceable through a programmed set of instructions.

The metric identifier device 216 of the data collection wireless device 106 may use computerized systems and algorithms and hardware components to process information relevant for identifying and defining the metrics depending on smart and important questions or criteria such as object specificity, measure progress towards goals, goal attainability, relevancy of goal to the node 1, time frame in which the goal will be achieved, etc. The metric identifier device 216 may further be configured to convert raw data into metric queues and store them in the local data reservoir 210 in a structured form. The metric identifier device 216 may in an example provide a list of metrics that are computer-executable and traceable and readable such that each metric represents a specific goal to be achieved by one or more devices either independently or together or in series wherein the goal is to be achieved by performing the computer-executable tasks either independently or together or in series. A timely completion of the computer-executable tasks by the devices at the node 1 successfully may represent a metric to be achieved or else not. Whether the metric is achieved or not is identified by evaluating the data collected from the various devices at the node 1 and analyzed and processed as discussed elsewhere in the document using the metric appliance 202 and various other systems as shown in various figures.

The network 102 may broadly represent one or more LANs, WANs, cellular networks (e.g., LTE, HSPA, 3G, and other cellular technologies, etc.), and/or networks using any of wired, wireless, terrestrial microwave, or satellite links, and may include the public Internet.

The network layer 206 may use a push gateway system 220 and/or a pull gateway system 222 to collect the data from the node 1 or the data collection wireless device 106 (which collects the data from the devices and sub-components at the node 1). In the pull gateway system 222, the network layer 206 may be allowed to send or ask queries to the local node 1 or the local data reservoir 210. In response to the queries, a computer-executable report in the form of a metric queue may be pulled in by the network layer 206 from the node 1. In the push gateway system 220, the network layer 206 may monitor various data entries at the node 1 and the node 1 may push the data in the form of the metrics queues into the network layer 206 to get transferred to such as a central database or a data aggregator 208 as will be discussed later. The network layer 206 or the data aggregator 208 may pull the local metric queues or simply metric queues from the node 1; or the node 1 may push it to the network layer 206 or the data aggregator 208 such that the pulled or the pushed data that gets reached to the network layer 206 or the data aggregator 208 may include computer-executable files containing information about date, location, time stamp, and the performance output indicative of performance of the computer-executable and traceable metrics along with other relevant data pertaining to the execution of the various tasks associated with the devices at node 1 and information pertaining to identification of the devices at the node 1, each defined by unique computer-executable identifiers.

The data collected from the node 1 may be stored in the central reservoir or the data aggregator 208. The data aggregator 208 may obtain the data in the form of the local metric queues from the node 1. The data aggregator 208 may similarly collect the metric queues from all other nodes 104 connected over the network 102 through the network layer 206. The data aggregator 208 may obtain measurements from all the nodes 104 in the network 102 and store them for a retention period or push it to the metric appliance 202 periodically or upon a request from the metric appliance 202.

In an embodiment, data collection techniques as executed and performed by the data collection wireless device 106 described and suggested herein may facilitate a computing resource monitoring service configured to collect the data at the node level or the data collection wireless device level and track a variety of unique information such as date, time, location, performance output etc. related to an event occurrence or a computer-executable and traceable task and/or a device associated with the node 1. The computing resource monitoring service facilitated by the data collection wireless device 106 may allow collecting the respective data from the node 1 in the peer network 102 to obtain the measurements for the metrics and transfer the measurements through the network layer 206 to the central database or the data aggregator 208 for identifying the metrics as achieved or not. The data collection wireless device 106 may also be referred to as a computing resource monitoring device interchangeably and may include a front-end server 224. The front-end server 224 may be configured to obtain data from various participants such as the various systems and sensors etc. available within the physical setting in various forms and transfer the collected data to the central database or the data aggregator or data reservoir 208. The front-end server 224 may transfer the raw data to a metric logistics device 226 coupled to or included within the data collection wireless device 106. The metric logistics device 226 structures the raw data into the local metric queues, wherein the local metric queues may then get converted into a suitable transferable form to get transferred to the central database or the data aggregator 208 through the network layer 206. The network layer 206 may use the push gateway system 220 or the pull gateway system 222 to collect the data from the local node 1 or the particular data collection wireless device 106.

The computer-controlled metric appliance 202 may obtain the measurements in the form of the local metric queues from the data aggregator 208 and store them locally in the database which may be the time series database 204 as mentioned earlier. The database may be a blockchain-configured repository in an embodiment, as will be discussed later. The computer-controlled metric appliance 202 with the help of certain computer rules and algorithms may define its own parameters for evaluating the metrics for each and every node 104 in the peer network 102 based on their functions and definitions of the computer-executable metrics at each node 104. These metric determination rules and algorithms may differ from node-to-node depending on the computer-executable tasks performed by the devices contained at the nodes 104 and their overall functioning within the network 102. The metrics as stored and processed by the computer-controlled metric appliance 202 in the form of computer-executable files may be treated as standard across the network and largely used in the same way across the various nodes 104 functioning in the same or similar categories of tasks or services. However, depending on the nature of operations or the tasks performed by the devices or the goals defined at the nodes 104, different metric may be defined for different purposes. For example, a physical setting may use annual visit by an entity as an input to define a computer-executable metric associated with one or more devices performing a computer-executable task. Another physical setting may use weekly blood dialysis as an input to define a computer-executable metric associated with one or more devices performing a computer-executable task.

The computer-controlled metric appliance 202 may ingest the measurements for the metrics obtained from the nodes 104 and compute real-time analytics on the basis of time/date stamps and location coordinates and store this information in the time series database 204 for the associated node 1 and the associated metric to validate performance of the devices performing specific tasks that contribute toward the metric at the node 1 and provide a computer-executable output indicative of whether the metric has been achieved or not. The computer-controlled metric appliance 202 is configured to generate the output that is indicative of the metric as achieved or not based on the metric queues obtained from such as the node 1 in the form of the computer-executable files or components.

In some embodiments, the data collected at the nodes 104 of the network 102 may be anonimized. The de-identification and anonimization of the data may be performed for privacy and security purposes such that any personal information may remain hidden about the devices or/and associated persons that generate the digital data which is collected by the data collection wireless device 106. For example, in an embodiment, an MRI machine may generate data digitally about a patient in the form of a digitally executable imaging report. The imaging report may include diagnostic information and personal information of the patient. When the information is shared to the data aggregator 208 and the computer-controlled metric appliance 202, the personal information may be removed so that the data is anonimized or de-identified for privacy and security reasons.

Figure 3:
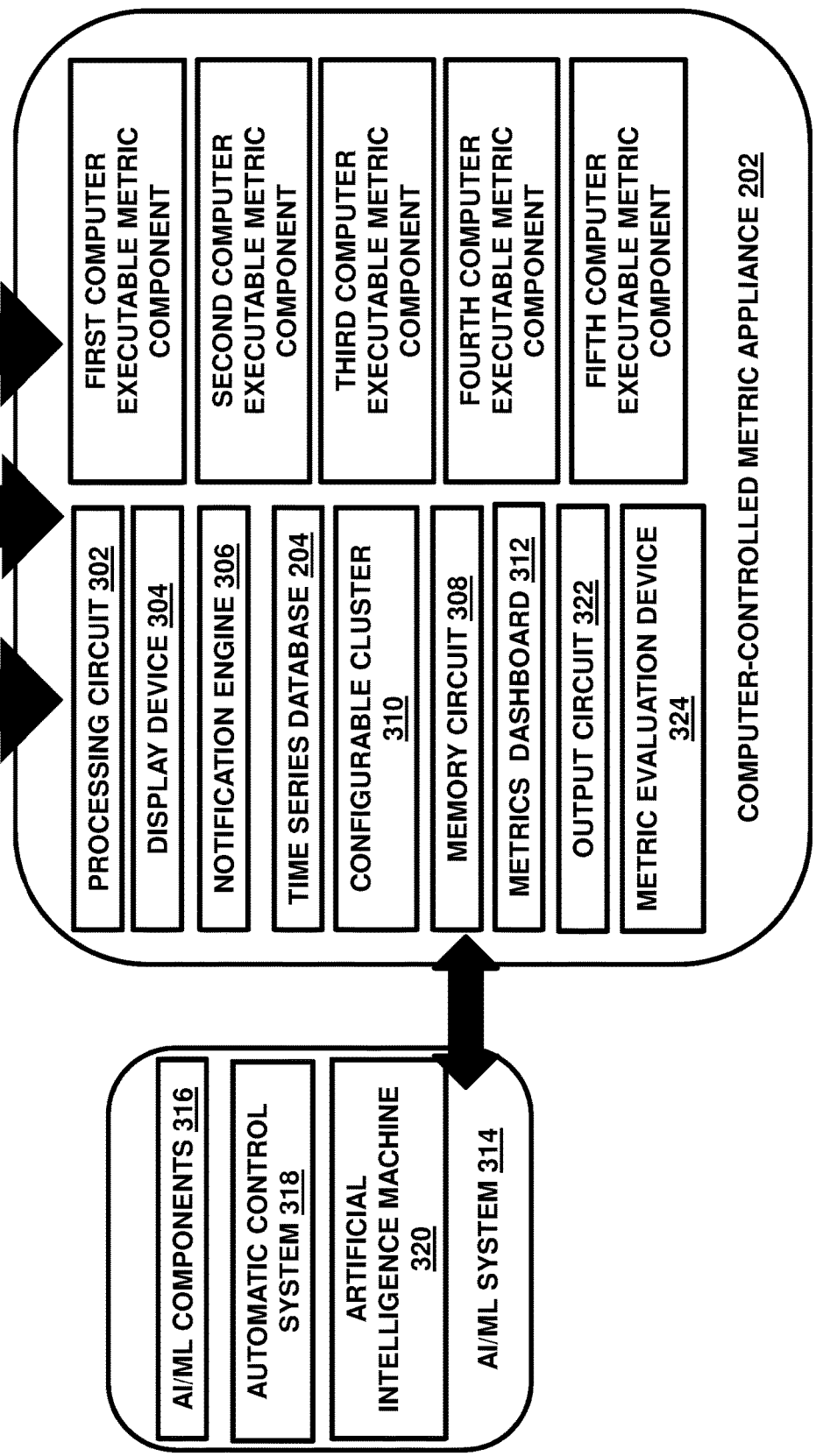
FIG. 3 illustrates a schematic diagram of a computer-controlled metric appliance connected with an artificial intelligence/machine learning system in accordance with an embodiment herein.

FIG. 3, with reference to FIGS. 1 and 2, illustrates a schematic diagram of a computer-controlled metric appliance connected with an artificial intelligence/machine learning system in accordance with an embodiment herein. The computer-controlled metric appliance 206 may include a special purpose processing circuit 302 (shown in FIG. 3) that may allow for processing, generating, and displaying information pertinent to performance priorities and performance status with respect to the computer-executable tasks performed at the nodes 104 by the various devices based on the output generated by the data collection wireless device 106 and components thereof in the form of the metric queues. The method of displaying by the processing circuit 302 may include displaying on a physical medium such as a display device 304 (shown in FIG. 3) as the computer-executable metric. The displaying may also include displaying on the physical medium a metric status indicator associated with the metric such that the metric status indicator provides information that is computer-executable and indicative of the status of the particular metric that is assigned a task to be performed by one or more of the devices either alone or in association at the node 1. In an embodiment, the metric status indicator may be generated to serve as the output (as mentioned above) by the processing circuit 302 that may be contained within the computer-controlled metric appliance 202. The metric status indicator may be computer-executable and indicative of the metric as achieved or not.

The metric queue received by the metric appliance 202 from the computer-controlled data collection wireless device 106 associated with the node 1 may include a plurality of computer-executable components including such as a first computer-executable metric component defined as a computer-executable file component storing information indicative of time of execution of the computer-executable task performed by a device within the node 1. The metric queue may further include a second computer-executable metric component defined as a computer-executable file component (or simply a computer-executable file referred alternatively) storing information indicative of date of execution of the computer-executable task performed by the device at the node 1. The metric queue may further include a third computer-executable metric component defined as a computer-executable file component storing information indicative of geographical coordinates (GPS location) associated with the execution of the computer-executable task performed by the device within the node 1 as obtained by the GPS device 218. The metric queue may further include a fourth computer-executable metric component defined as a computer-executable file component storing information indicative of digital identification details of the device and the associated entity such as the person pertinent to the execution of the computer-executable task performed by the device or machine (machine and device are referred to interchangeably throughout the document) at the node 1. The metric queue may further include a fifth computer-executable metric component defined as a computer-executable file component storing information indicative of the computer readable and executable performance data associated with the computer-executable task performed by the machine or the device.

The metric appliance 202 may process the first computer-executable metric component, second computer-executable metric component, third computer-executable metric component, fourth computer-executable metric component, and the fifth computer-executable metric component to generate the computer-executable metric output or the performance indicator, with the use of the processing circuit 302, that is indicative of the status and the performance of the computer-executable task. The output may be used to infer whether the metric has been achieved successfully or not and accordingly a notification may be generated by a notification engine 306. The time series database 204 that may be included in or communicatively coupled to the metric appliance 202 may store the digital data received from the nodes as the metric queues and the processed information generated by the processing circuit 302 and the computer-executable output generated by the processing circuit 302 in the time series database 204.

The time series database (TSDB) 204 may be optimized for time-stamped or time series data stored digitally in a memory circuit 308 (shown in FIG. 3). The time series data may include the measurements or the event occurrences that are tracked, monitored, down-sampled, and aggregated over time and maintained in the form of the metric queues. The time series data stored in the TSDB 204 may include server metrics, application performance monitoring, network data, sensor data, events, clicks, and many other types of analytics data maintained digitally that is computer-executable.

The time series database 204 is built specifically for handling metrics and events or measurements that are time-stamped. The TSDB 204 may be optimized for measuring change over time. Properties that make this time series data very different than other data workloads are data lifecycle management, summarization, and large range scans of many digital records.

In an embodiment, the time series database 204 may store a set of key figure values such that each key figure value may represent a computer-executable task associated with a metric queue that is organized and stored in a number of configurable clusters 310 (shown in FIG. 3) based on the association of the key figure values and the individual time periods in the time series associated with the computer-executable task. A size of a configurable cluster may be based on number of computer-executable tasks associated with the metric or the metric queue and number devices involved in achieving the metric.

In embodiments, clustering can be performed based on various rules, for example, either a fixed number of key figure values in each entry of the database table may be provided. In this case the cluster size is arbitrary up to the limit imposed by the maximum width of database tables. In another case, entries may be grouped according to properties of larger time intervals; e.g., all individual periods of one week or one month. The clustering mechanism and the cluster size are chosen carefully so as to align it with the way algorithms access the data. The trade-off may be between reading too many entries and reading too large of data volume. Clustering is useful when multiple key figure values are regularly read and written together.

In an embodiment, the data stored in the time series database 204 may be comprised of a data type that may model technical properties and structure of a set of time series, and specifies characteristics, key figures and a time profile. The time series data type may specify the structural properties of the data storage for the related time series data areas, in particular, for example, the structure of the database tables for the key figure values, characteristics, states, notes and history data.

In an example, the metric appliance 202 may include a metrics dashboard 312 (shown in FIG. 3) that may facilitate displaying of information pertinent to the metrics in the form of user-friendly statistical patterns, graphical images, and other patterns, for easy analyzing and understanding by users in general who have necessary access, that may indicate performance of the metrics and the various tasks associated with the metrics in the entire network 102 of the nodes 104. This may give a holistic view about overall performance across the network by relevant administrative devices and authorities.

The metric appliance 202 may include an output circuit 322 that presents the computer readable and executable output on the display device 304. The display device 304 then outputs the computer readable and executable output. The output is indicative of whether the metric is achieved or not. The metric appliance 202 may further include a metric evaluation device 324 that receives an input from a machine or a system at the nodes 104 whether a discrepancy is noted between the output indicative of whether the metric is achieved or not, and actual performance toward the metric by the machine or the system associated with the nodes 104. Based on the input received, the artificial intelligence machine 320 generates a feedback signal for evolving and modifying rules to monitor performance of the metrics by the metric appliance 202 so the subsequent monitoring of the metrics may result in minimized errors and better accuracy about the performance of the computer executable and traceable tasks. This may help avoiding the occurrence of errors and discrepancies in the monitored performance and the actual performance of the tasks by various devices located at the nodes 104. In an example, the metric evaluation device 324 that receives the input from the machine when the discrepancy is detected between the output and the actual performance toward the metric by the machine may cause the processing circuit 302 to select data corresponding to either the output or the actual performance for metric measurement during the same performance session.

In an embodiment, the computer-executable metrics as discussed herein may include health, security, and social determinants measures that may be used for regulatory compliance as well as improving performance by the devices at the nodes 104 connected over the network 102. In an embodiment, the computer-executable tasks performed by the devices associated with a particular metric queue or metric may define a task workflow when located in a particular series of steps, wherein the computer-executable tasks may be performed by the one or more machines at such as the node 1. The system 200 in an embodiment may allow one to create team-based multi-stakeholder health, safety, and social determinants measurement networks across institutions that may be denoted by the nodes 104 discussed herein. The system 200 may allow to track real outcomes and effectiveness of the workflows across the network 102. In an embodiment, the system 200 may be configured to easily install HL7, FHIR, SQL, and custom metrics and measures exporters onto existing systems. The system 200 may monitor the events in real-time and immediately alerts when the metrics are missing or faulty. The system 200 may allow to calculate efficacy of service such as care across multiple best practices definitions such as NQF, HEDIS, NCQA, CMS, FDA defined within the network 102.

In an embodiment, the system 200 may allow sharing of the measurements and/or the metric queues effectively and provide reports to intended parties and allow tracking whether metrics are being put into action.

Figure 4:
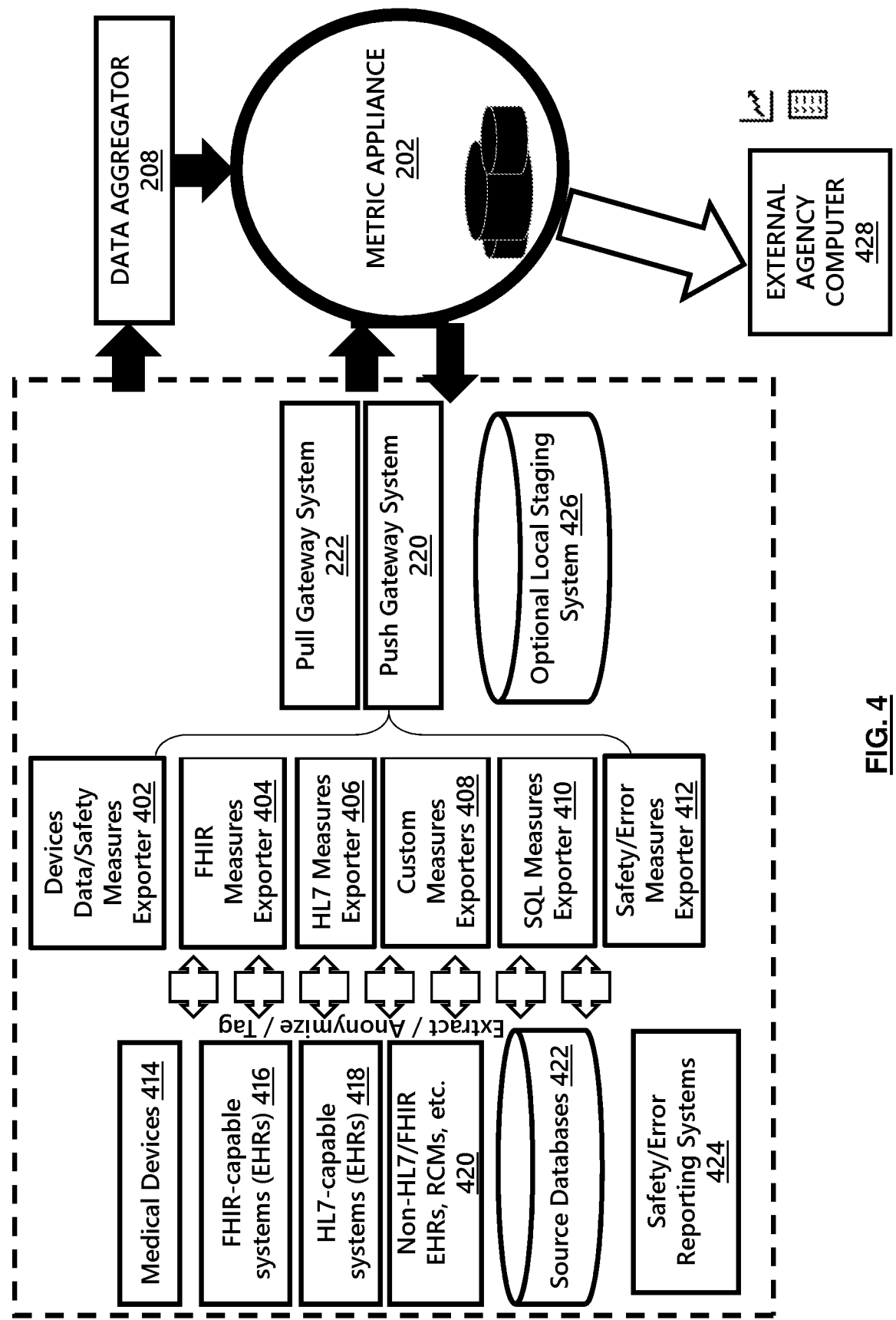
FIG. 4 illustrates another example of the computer system of FIG. 2 in accordance with an embodiment herein.

FIG. 4, with reference to FIGS. 1 through 3, illustrates an example of various components referred to as exporters of the computerized data collection wireless device 106 that are connected to the devices or the machines at the node 1 generating the digital data. The computerized data collection wireless device 106 may include a devices data/safety measures exporter 402 to collect data from the machines pertaining to their identification details or safety related data. The computerized data collection wireless device 106 may include a Fast Healthcare Interoperability Resources (FHIR) measures exporter 404 to collect related data from the machines. The computerized data collection wireless device 106 may include a HL7 measures exporter 406 to collect data related to the HL7 standards from the machines. The computerized data collection wireless device 106 may include a custom measures exporter 408 to collect data in accordance with predefined metrics that may be customized for specific tasks executed by the machines. The computerized data collection wireless device 106 may include a SQL measures exporter 410 from the machines. The computerized data collection wireless device 106 may include a safety/error measures exporter 412 to collect relevant data about safety and errors from the machines as the tasks are executed by them for defined performance and metric achievements.

The devices or machines that may generate the digital data extracted by the data collection wireless device 106 or its components (exporters) thereof may include such as medical devices 414, FHIR-capable systems (EHRs) 416, HL7-capable systems (EHRs or electronic health record systems) 418, Non-HL7/FHIR EHRs etc. 420, source databases 422, and safety/error reporting systems 424. The system 200 may include an optional local staging system 426 for staging the extracted or collected data locally before sending it further to the data aggregator 208 or the metric appliance 202. The reports or analytics or alerts may be sent to an external agency computer 428.

In various embodiments, the system 200 may define a variety of reference models for the metric queues. These reference models may utilize properties on which the computer readable and traceable metrics may be categorized. In an example, the categorization of the metrics and defining a reference model in view of this categorization may be performed based on functional roles of the devices in the network 102. The functional roles may be considered a property on which the metrics may be grouped together in categories. A functional role in the network 102 is a specific computer-executable task performed by a device that is connected digitally in the network 102. Various types of roles may be defined by a user as an input for developing and/or defining the reference model or may be generated based on machine learning by using past data pertinent to operation and specification of the devices.

In an example, the system 200 may facilitate metrics aggregation across the network 102 to enable a trusted human and/or an artificial intelligence/machine earning system (AI/ML system) 314 for decision-making based on real-time evidence as generated by the computer-controlled metric appliance 202. The real-time evidence may be generated based on the output generated by the metric appliance 202 using the aggregation of the metrics from across the participants or the devices in the network 202. The aggregation of the metrics allows the humans and/or the AI/ML system 314 to perform complex decision-making tasks either manually or digitally to achieve certain predefined targets. The AI/ML system 314 may perform simple and tactical tasks smartly in the absence of humans because the computer-executable metrics are trustworthy. The AI/ML system 314 may generate integrated AI/ML-based alerts based on certain predefined computer-executable rules that may be defined either by human manually or generated by the network 202 and shared across the participants. These alerts may be indicative of certain metrics being achieved or lagging behind or not achieved etc. Accordingly, appropriate steps may be taken by recipients of the alerts for ensuring metrics are achieved in a better way.

In an example, the AI/ML system 314 may perform automated analysis to determine why certain measures and/or metrics are being seen on the network so that proper network participants may be alerted to specific actions. By monitoring the performance of the devices and respective metrics, the AI/ML system 314 may generate AI/ML-based predictions of future expected values and "measure gaps" analysis—to timely alert in advance when certain data may be expected but doesn't appear or vice-versa. This may allow the recipients to take necessary steps for better performance of the devices. The AI/ML system 314 may include references to AI/ML components 316 that may be added as AI/ML hardware references at collection sources, in the network 102 itself, or on a blockchain side, etc.

In an example, the AI/ML system 314 may carry out predetermined inference on the basis of the metrics aggregated, and take action in accordance with certain inference results generated as a result of analysis by the AI/ML system 314. An automatic control system 318 may be provided and adapted for a target action to be taken by an artificial intelligence machine 320 of the AI/ML system 314 on the basis of the aggregated metrics and the inference results and generate a control output for taking the target action such as generating the alert. This control output may predict inconveniences or gaps to be encountered in the performance of the execution of the computer-executable tasks by the participants in the network 102. The AI/ML system 314 may eliminate such inconveniences or gaps and stores results of the inference in the memory circuit 308. In an example, the AI/ML system 314 may be adapted to drive the artificial intelligence machine on the basis of the inference results and the control output for past events stored in the memory circuit 308.

FIG. 5, with reference to FIGS. 1 through 4, illustrates an exemplary blockchain-configured ecosystem architecture 500 containing one or more components of the system 200 as discussed in conjunction with FIG. 2 and also contain additional components so as to allow integrity of transactions and the digital data (including the metric queues) shared/processed during the transfer or storage as discussed above in the document. The blockchain-configured ecosystem architecture 500 may provide a crowdsourced integrity network for storing the data authorized for sharing across the network 102 instead of locally stored information by different participants or nodes or databases that may be tampered with.

The ecosystem architecture 500 may be blockchain-configured involving various blockchain devices. For example, the nodes 104 may all interact with a blockchain device 502 through a plurality of blockchain configured distributed access points 504. A network that facilitates interaction across all components may be a blockchain integrity network. The blockchain network may build trust among the various participants or entities or nodes 104 and their associated computing terminals or devices even if the devices/terminals or machines etc. may not know one another. The blockchain network may allow connections and transactions and recording and sharing of the data and various codes/token generated during an entire transaction including service tokens and authorization tokens in a trusted mode. A record of transactions and sharing and data from various terminals/devices stored on the blockchain in the form of computer-executable distributed ledgers 506 may provide proof to command the necessary trust among the terminals/devices (such as those associated with various participants/nodes 104 including the first node 1, the second node 2, and the third node 3 without limitations) to cooperate through a peer-to-peer or peer-to-client distributed digital ledger technology. The ecosystem architecture 500 may include a distributed trusted ledgers system 514 containing the distributed blockchain ledgers 506 associated with a plurality of computing terminals and devices such that each ledger stores a copy of computer-executable files 516 containing the metric queues corresponding to computer-executable tasks and the trust notes for defining security and trust among the computing terminals and devices across the network so that each computing terminal trusts the other computing terminal through the blockchain. The distributed ledgers system 514 enables coding of rules-based contracts that execute when specified conditions are met. The distributed ledgers 506 make it easier to create cost-efficient networks where any device or any evidence associated with a task execution or transaction may be tracked, without requiring a central point of control.

The various computing terminals or devices in the network serve as distributed peer-to-peer nodes and connections. The metric appliance 202 may be configured to perform the task of processing the metric queues further through the blockchain network based on the rules as defined and discussed elsewhere. Each terminal/device/node in the ecosystem architecture 500, etc. may get a copy of the blockchain which may get downloaded automatically upon joining the blockchain integrity network. Every node or the device in the network is an administrator of the blockchain, and may join the network voluntarily so that the network is decentralized.

The blockchain may eliminate the risks that come with data being held centrally by storing data across the network which may include the computer-executable files containing the metric queues and/or the various tokens/codes including transaction codes. The blockchain security use encryption technology and validation mechanisms for security and integrity verification. The security may be enabled through public and private keys. A public key may define a user's address on the blockchain. The private key may give its owner an access to various digital assets in the network.

In an embodiment, the distributed ledgers 506 may enable coding of smart contracts (with the use of such as smart contract systems) that will execute when specified conditions are met. These smart contracts may protect various information pieces associated with the service deliveries and other transactions and data processing/storage and eliminate the risk of files copying and redistribution without protecting privacy rights.

The blockchain-configured ecosystem architecture 500 may provide a private view for the various devices and the entities operating in the network through the private data store 518 so that each such device may privately access the computer-executable files 516 associated with a node or a device at the node based on various policies such as based on their respective identities. Each of the data collection wireless device such as 106A and 106B and 106C may access the computer-executable files 516 through the dedicated private store 518 available through the plurality of distributed blockchain-configured access points 504 which may be enabled in the form of distributed blocks as shown in FIG. 5, with each block providing a facility to access the features of the blockchain-configured ecosystem architecture 500 by different terminals and devices at the same time based on defined and granted access rights.

The private data store 518 may provide a virtual storage to facilitate interaction, information exchange, reviewing, and presentation of the computer-executable files 516. For example, the private data store 518 may allow a virtual storage and presentation of only limited executable files or portions of the executable files for access by particular entities or participants in accordance with permissions granted for reviewing. The private data store 518 may be configured to auto-hash review interactions at any required interval. This compartmentalization of the computer-executable files 516 ensures that the computer-executable files 516 are secured and private as per access rights authorized to the nodes. The data presented on the private data store 518 of the blockchain serves as a secure way to ensure that the private data store 518 is in sync with any permissioned access.

In an embodiment, the blockchain-configured digital ecosystem architecture 500 may provide a federated blockchain comprising of several entities/participants and their associated computers and devices and sensors that jointly interact to process transfers of data through a trusted, secured and distributed network of the blockchain-configured access points 504.

The various components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 6, with reference to FIGS. 1 through 5. This schematic drawing illustrates a hardware configuration of an information handling/computer system 700 in accordance with the embodiments herein. The system 600 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 700 can read the inventive instructions on the program storage devices and follow these instructions to execute the methodology of the embodiments herein. The system 700 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

Some embodiments of the present invention are listed as examples herein without limitations. An example herein provides a computer-controlled system for digitally evaluating one or more computer-executable and traceable metrics associated with a machine at a node. The system includes a computerized data collection wireless device for collecting digital data stored in the form of a plurality of computer-executable files from the machine associated with the node in a physical setting. The node is communicatively connected with one or more other nodes such that the one or more other nodes and the node together form a computer network of nodes. The computerized data collection wireless device includes a metric logistics device configured to generate a metric queue containing a plurality of computer-executable metric components storing information indicative of at least one of a date, time, geo-coordinates, machine identification details, and computer readable and executable performance data associated with the machine. The system further includes a data aggregator configured to receive and store the metric queue from the node locally for a retention period. The system further includes a computer-controlled metric appliance communicatively coupled to the data aggregator and receiving the metric queue from the data aggregator, wherein the computer-controlled metric appliance includes a processing circuit that is configured to analyze and process the metric queue associated with the machine at the node to generate a computer readable and executable output that is indicative of whether the metric is achieved or not by the machine. The computer-controlled metric appliance includes a time series database built to handle the computer-executable metric queue and associated measurements that are time-stamped and location-stamped in the form of a plurality of computer-executable metric clusters of time-location series. The computer-controlled metric appliance further includes a blockchain device communicatively coupled with the time series database for providing blockchain capabilities to the computer-controlled metric appliance, wherein the blockchain device includes a distributed digital ledger system for storing trust notes and creating smart contracts associated with the metric queue.

In an example, the machine may be a first machine such that the first machine may be communicatively coupled to a second machine and a third machine, wherein each of the first machine, the second machine, and the third machine may be located physically at the node such that the node may be communicatively coupled to the other nodes in the network wirelessly. In an example, the metric and the computer-executable task may be dependent on performance of the first machine and the second machine. In an example, the metric and the computer-executable task may be dependent on performance of the first machine only.

In an example, the plurality of computer-executable metric components of the metric queue may include a first computer-executable metric component defined as a computer-executable file storing information indicative of time of execution of the computer-executable task performed by the machine at the node. In an example, the plurality of computer-executable metric components of the metric queue may include a second computer-executable metric component defined as a computer-executable file storing information indicative of date of execution of the computer-executable task performed by the machine at the node.

In an example, the plurality of computer-executable metric components of the metric queue may include a third computer-executable metric component defined as a computer-executable file storing information indicative of geographical coordinates (GPS location) associated with the execution of the computer-executable task performed by the machine at the node. In an example, the plurality of computer-executable metric components of the metric queue may include a fourth computer-executable metric component defined as a computer-executable file storing information indicative of digital identification details of the machine and an associated entity pertinent to the execution of the computer-executable task performed by the machine at the node. In an example, the plurality of computer-executable metric components of the metric queue may include a fifth computer-executable metric component defined as a computer-executable file storing information indicative of the computer readable and executable performance data associated with the computer-executable task performed by the machine.

In an example, the system may further include a GPS device to collect location details by real-time tracking of the event occurrences or performance of the computer-executable tasks as executed by the machine at the node. In an example, the time series database may include a memory for storing time-stamped or time series data digitally, such that the stored data may include measurements and event occurrences that may be tracked, monitored, down-sampled, and aggregated with time and maintained in the form of the metric queue. In an example, the time series database may store a set of key figure values such that each key figure value may be indicative of a computer-executable task associated with the metric queue that may be organized and stored in the form of the configurable clusters based on an association of the key figure values and respective individual time periods in the time series associated with the computer-executable task.

In an example, the metric appliance may further include a metrics dashboard to display information pertinent to the metric queue in the form of user-friendly statistical patterns and graphical images on a display device. In an example, the computerized data collection wireless device may further include a metric identifier device configured to define and provide a set of computer-executable identifiers for the one or more computer-executable and traceable metrics. In an example, the set of computer-executable identifiers may be determined based on a plurality of inputs either provided manually through a computerized system or generated through an automated process based on data acquired from one or more information sources. In an example, the blockchain device may be coupled to a private data store such that an entity accesses the time series database through the private data store.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-controlled system for digitally evaluating one or more computer-executable and traceable metrics associated with a machine at a node, the system comprising:
   a computerized data collection wireless device for collecting digital data stored in the form of a plurality of computer-executable files from the machine associated with the node in a physical setting, wherein the computer data collection wireless device comprises a local data reservoir, a time tracking device, a date tracking device, and a metric identifier device, wherein the node is communicatively connected with one or more other nodes such that the one or more other nodes and the node together form a computer network of nodes, and wherein the computerized data collection wireless device comprises a metric logistics device that generates a metric queue containing a plurality of computer-executable metric components storing information indicative of at least one of a date, time, geo-coordinates, machine identification details, and computer readable and executable performance data associated with the machine;
   a data aggregator that receives and stores the metric queue from the node locally for a retention period;
   a computer-controlled metric appliance directly connected to the data aggregator and that receives the metric queue from the data aggregator, wherein the computer-controlled metric appliance is not a part of the data aggregator, and wherein the computer-controlled metric appliance comprises a processing circuit that analyzes and processes the metric queue associated with the machine at the node to generate a computer readable and executable output that is indicative of whether the metric is achieved or not by the machine, the computer-controlled metric appliance comprising:
      a time series database that handles the computer-executable metric queue and associated measurements that are time-stamped and location-stamped in the form of a plurality of computer-executable metric clusters of time-location series, wherein the time series database stores a set of key figure values such that each key figure value is indicative of a computer-executable task associated with the metric queue that is organized and stored in the form of the configurable clusters based on an association of the key figure values and respective individual time periods in the time series associated with the computer-executable task; and
      a blockchain device communicatively coupled with the time series database that provides blockchain capabilities to the computer-controlled metric appliance, wherein the blockchain device includes a distributed digital ledger system for storing trust notes and creating smart contracts associated with the metric queue,
   wherein the metric identifier device converts raw data into metric queues and stores the metric queues in the local data reservoir in a structured form, wherein the time tracking device comprises a computerized digital clock that tracks the time of any entry or exit of data related to one or more computer-executable tasks associated with one or more devices at the node, wherein the date tracking device executes a computerized software process that tracks a date associated with an event at the node in the computer network, and wherein an output generated by the time tracking device and the date tracking device is used to determine if a metric is pending or if the metric is about to be complete in the future or if there is a progress in a performance for the metric with respect to a passage of time and if the progress is as expected.

2. The system of claim 1, wherein the machine is a first machine such that the first machine is communicatively coupled to a second machine and a third machine, and wherein each of the first machine, the second machine, and the third machine are located physically at the node such that the node is communicatively coupled to the other nodes in the network wirelessly.

3. The system of claim 2, wherein the metric and the computer-executable task is dependent on performance of the first machine and the second machine.

4. The system of claim 2, wherein the metric and the computer-executable task is dependent on performance of the first machine only.

5. The system of claim 1, wherein the plurality of computer-executable metric components of the metric queue comprises a first computer-executable metric component defined as a computer-executable file storing information indicative of time of execution of the computer-executable task performed by the machine at the node.

6. The system of claim 1, wherein the plurality of computer-executable metric components of the metric queue comprises a second computer-executable metric component defined as a computer-executable file storing information indicative of date of execution of the computer-executable task performed by the machine at the node.

7. The system of claim 1, wherein the plurality of computer-executable metric components of the metric queue comprises a third computer-executable metric component defined as a computer-executable file storing information indicative of geographical coordinates (GPS location) associated with the execution of the computer-executable task performed by the machine at the node.

8. The system of claim 1, wherein the plurality of computer-executable metric components of the metric queue comprises a fourth computer-executable metric component defined as a computer-executable file storing information indicative of digital identification details of the machine and an associated entity pertinent to the execution of the computer-executable task performed by the machine at the node.

9. The system of claim 1, wherein the plurality of computer-executable metric components of the metric queue comprises a fifth computer-executable metric component defined as a computer-executable file storing information indicative of the computer readable and executable performance data associated with the computer-executable task performed by the machine.

10. The system of claim 1, further comprising a GPS device that collects location details by real-time tracking of the event occurrences or performance of the computer-executable tasks as executed by the machine at the node.

11. The system of claim 1, wherein the time series database comprises a memory that stores time-stamped or time series data digitally, such that the stored data includes measurements and event occurrences that are tracked, monitored, down-sampled, and aggregated with time and maintained in the form of the metric queue.

12. The system of claim 1, wherein the metric appliance further comprising a metrics dashboard that displays information pertinent to the metric queue in the form of user-friendly statistical patterns and graphical images on the display device.

13. The system of claim 1, wherein the metric identifier device defines and provides a set of computer-executable identifiers for the one or more computer-executable and traceable metrics.

14. The system of claim 13, wherein the set of computer-executable identifiers are determined based on a plurality of inputs either provided manually through a computerized system or generated through an automated process based on data acquired from one or more information sources.

15. The system of claim 1, wherein the blockchain device is coupled to a private data store such that an entity accesses the time series database through the private data store.

* * * * *